United States Patent [19]

Tyuuman

[11] 4,405,160
[45] Sep. 20, 1983

[54] HOSE JOINT WITH COOLING FINS

[75] Inventor: Tutomu Tyuuman, Toyota, Japan

[73] Assignee: Toyota Jidosha Kogyo Kabushiki Kaisha, Toyota, Japan

[21] Appl. No.: 206,662

[22] Filed: Nov. 13, 1980

[30] Foreign Application Priority Data

Jul. 24, 1980 [JP] Japan ............................... 55-101578

[51] Int. Cl.³ ............................................ F16L 35/00
[52] U.S. Cl. ...................................... 285/39; 285/41; 285/174; 285/239; 285/286; 285/DIG. 7; 123/41.31
[58] Field of Search ................... 285/41, 39, 187, 174, 285/239, 286, DIG. 7; 137/338; 165/151, 184, 181; 123/41.31, 198 R

[56] References Cited

U.S. PATENT DOCUMENTS

| 2,046,968 | 7/1936 | Raisley | 165/181 X |
| 2,053,239 | 9/1936 | Forrer et al. | 165/181 |
| 3,332,476 | 7/1967 | McDougal | 165/51 |
| 3,578,952 | 5/1971 | Boose | 165/184 X |
| 3,966,238 | 6/1976 | Washewicz | 285/239 |
| 4,128,264 | 12/1978 | Oldford | 285/41 |

FOREIGN PATENT DOCUMENTS

| 1051297 | 2/1959 | Fed. Rep. of Germany | 165/184 |
| 366402 | 7/1906 | France | 165/51 |

Primary Examiner—Dave W. Arola
Attorney, Agent, or Firm—Parkhurst & Oliff

[57] ABSTRACT

A hose joint, for mainly used in a vehicle for taking out negative pressure from the intake manifold, provided with a hose attaching portion, a threadedly attachable portion, and a cooling portion with at least one cooling fin for radiating heat from a heat source such as the intake manifold, so as to protect a hose attached to the hose attaching portion from heat damage. The cooling fin or fins can be variously designed within the purpose of radiating the heat from the heat source not to reach at an unpermissible high temperature to the hose.

12 Claims, 16 Drawing Figures

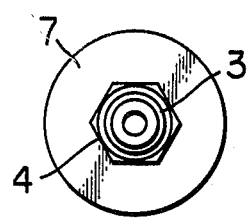
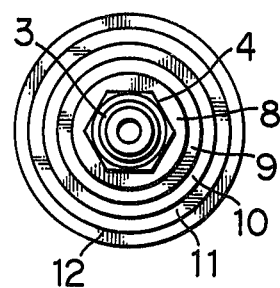
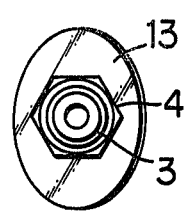
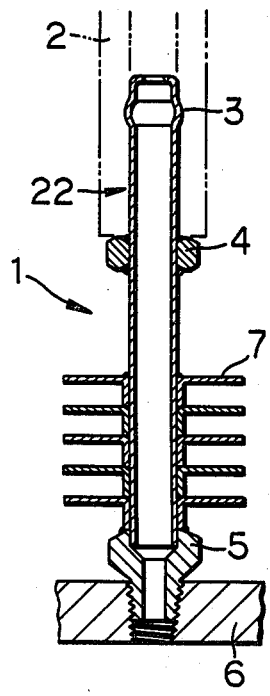
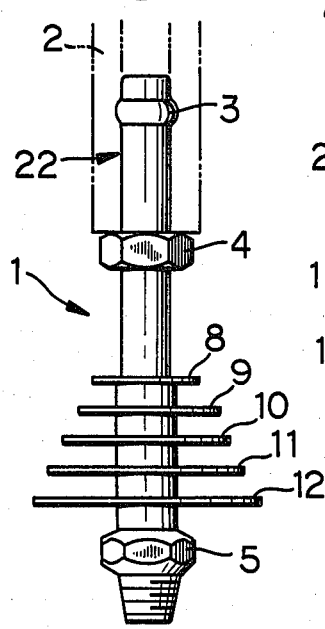
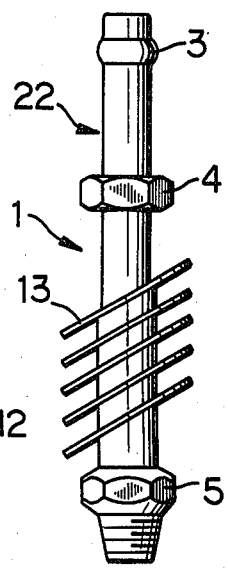

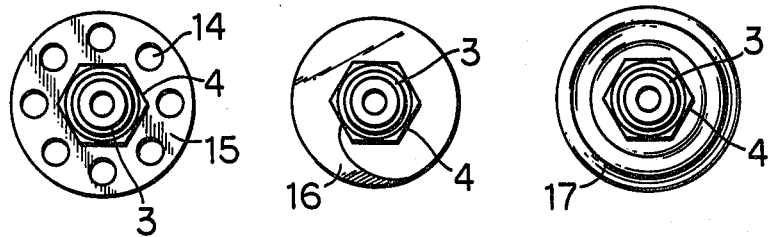
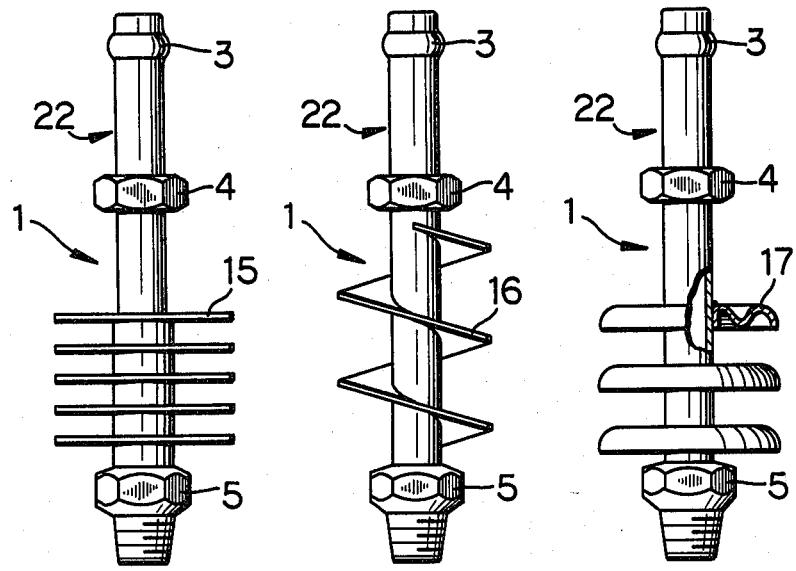

HOSE JOINT WITH COOLING FINS

BACKGROUND OF THE INVENTION

This invention relates to structure of a hose joint, for connecting a hose to a high temperature apparatus such as piping, pump and valve, with an object of protecting the former from heat damage caused by the latter.

It is usually practiced for taking out gaseous pressure with a hose from a high temperature apparatus to employ a metal-made hose joint in such a way as to be threadedly connected on one end thereof to the high temperature apparatus and to be fitted, on the other end thereof, on by a hose.

As the hose in such a case an organic elastic material such as synthetic rubber is generally used as its material, when a hose of synthetic rubber is subjected to, via the hose joint, high temperature beyond its resistible limit caused by the apparatus which is possibly of high temperature, the very hose is liable to be deteriorated by the heat. Particularly when the high temperature apparatus happens to be an intake manifold of an internal combustion engine, a hose for taking out negative pressure of the intake manifold may possibly be deteriorated to become fragile. It can cause a brake booster or an ignition timing regulating device which utilizes the negative pressure to be inoperative, leading to a grave accident.

For avoiding such a disadvantage elongation of the hose joint for isolating the hose from the intake manifold has been proposed and practiced, which is however not so practicable, because the hose joint is likely to be weakened by engine vibration and to additionally narrow the confined engine room all the more. Another idea of employing a hose of highly resistible to a high temperature inevitably brings about a cost rising therefor.

SUMMARY OF THE INVENTION

This invention was made from such a background. It is therefore a primary object of this invention to provide a compact and inexpensive hose joint capable of restraining temperature rising of a hose connected to the hose joint even if the hose joint itself is being connected (communicated) with a high temperature apparatus.

A hose joint in accordance with this invention is built up such that, for attaining the above-mentioned object, it is provided with a hose attaching portion on one end thereof, a threadedly attachable portion on the other end, and a cooling portion having a plurality of cooling fins in the middle of the two portions, whereby the heat applied to the threadedly attachable portion can be radiated or diffused through the cooling fins so as to restrain the temperature rising of the hose attaching portion.

A hose joint according to the invention, when it is utilized to an intake manifold for taking out the negative pressure therefrom, can largely enhance the reliability of a brake booster or an ignition timing regulating device which depends on the negative pressure from the intake manifold.

BRIEF DESCRIPTION OF THE DRAWINGS

FIG. 1 is a plan view of an embodiment of a hose joint in accordance with this invention;

FIG. 2 is an axial sectional view of the hose joint shown in FIG. 1;

FIG. 3 is a plan view of another embodiment of a hose joint in accordance with this invention;

FIG. 4 is a elevational view of the hose joint shown in FIG. 3;

FIG. 5 is a plan view of another embodiment of a hose joint in accordance with this invention;

FIG. 6 is an elevational view of the hose joint shown in FIG. 5;

FIG. 7 is a plan view of another embodiment of a hose joint in accordance with this invention;

FIG. 8 is an elevational view of the hose joint shown in FIG. 7;

FIG. 9 is a plan view of another embodiment of a hose joint in accordance with this invention;

FIG. 10 is an elevational view of the hose joint shown in FIG. 9;

FIG. 11 is a plan view of another embodiment of a hose joint in accordance with this invention;

FIG. 12 is an elevational view of the hose joint shown in FIG. 11;

DETAILED DESCRIPTION OF THE PREFERRED EMBODIMENTS

Figure 13:
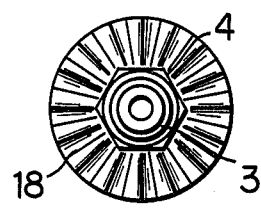
FIG. 13 is a plan view of another embodiment of a hose joint in accordance with this invention.

With reference to the appended drawings preferred embodiments will be described hereunder.

Numeral 1, in FIGS. 1 and 2, designates a hose joint of tubular shape. At a hose attaching portion 22 on the upper part of the hose joint 1, as seen in the elevational view thereof in FIG. 2, an annular protuberance 3 is formed to prevent a hose 2 fitted thereon from coming off. At the lower end of the hose attaching portion 22 an annular body 4 of hexagonal nut shape is brazed for functioning as a stopper for the hose 2 an also as an engaging portion for a tool when the hose joint 1 is threaded in place, i.e., to a later described intake manifold 6. On the lowermost portion of the hose joint 1 a screw member 5 having a male screw formed on it is brazed, which functions as a threading portion when the hose joint 1 is connected to the intake manifold 6 in an uprightly erected posture therefrom. An in-between or intermediate portion from the annular body 4 to the screw member 5 constitutes a cooling portion whereon five fins 7 of circular plate shape, having an identical diameter size, are horizontally fitted, one above the other with an equal gap from each other, for being brazed firmly there. This type fins are advantageous in the low manufacturing cost because of their identical or uniform shape.

Although the high temperature of the not-shown exhaust manifold which is located beneath the intake manifold 6 is transmitted, by way of the intake manifold 6 and the hose joint threaded thereto, to the hose 2, the radiation of the heat into the atmosphere by the cooling fins 7 restrains the temperature of the hose attaching portion not to exceed 120° C., the resistible temperature for ordinary hoses. In comparison to the conventional hose joints without cooling fins the invented one lowers the temperature of the hose attaching portion by 30° C. by virtue of the cooling fins 7. The fins 7 simultaneously function to intercept the radiant heat from the intake manifold 6.

Other embodiments of this invention will be described hereunder. All of them are dissimilar to the previous embodiment only in the shape of the fins, requiring no superfluous explanation on the similar portions.

In another embodiment in FIGS. 3 and 4, five circular fins 8–12, being progressively larger in the diameter from top to bottom, are horizontally fitted on the cooling portion of the hose joint 1 one above the other with an equal inter-distance for being brazed there. This type is advantageous in securing a necessary space on the side of the hose 2, and superior to the embodiment shown in FIG. 2 in the heat radiating capability, as a larger fin is fitted to a higher temperature position progressively, even if the total area of all fins is assumed to be equal.

On the cooling portion of the hose joint 1 of another embodiment shown in FIGS. 5 and 6 five fins 13 of circular plate shape, being identical in the diameter thereof, are fitted in a slanted posture to the axis of the hose joint 1 one above the other and with an equal inter-distance from each other being brazed there. Even when the hose joint 1 is installed, in this case, in the vertical direction such cooling fins 13 are advantageous for obtaining good cooling effect by securing ventilation due to the natural convection.

On the cooling portion of the hose joint 1 of another embodiment shown in FIGS. 7 and 8 five fins 15 of circular plate shape, being identical in the diameter thereof and provided with eight through-holes 14 for venting, are horizontally fitted one above the other with an equal inter-distance from each other for being brazed there. This type find are advantageous in enhancing the cooling effect even when the hose joint 1 is installed in the vertical direction.

On the cooling portion of the hose joint 1 of another embodiment shown in FIGS. 9 and 10 a spiral fin 16 with a constant height is brazed, being wound about the cooling portion with a uniform pitch in an upright posture at a right angle to the axis thereof. Such a fin is advantageous in being vibration resistive because of its enhanced rigidity. Another merit thereof lies in its allowing an integral formation of the entire fin 16.

On the cooling portion of the hose joint 1 of another embodiment shown in FIGS. 11 and 12 three fins 17 of circular shape, being respectively radially corrugated to form concentrical waves, are brazed horizontally and one above the other with an equal inter-distance from each other. This type hose joint 1 is advantageous in that each fin provides a larger surface area for good heat radiation, allowing to decrease the number of installed fins with a result of diminishing the space needed for attaching the hose joint 1.

Figure 14:
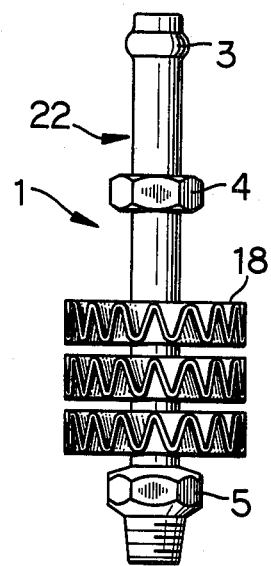
FIG. 14 is an elevational view of the hose joint shown in FIG. 13.

On the cooling portion of the hose joint 1 of another embodiment shown in FIGS. 13 and 14 three fins 18 of circular shape, being respectively corrugated in a circumferential direction to form radial ribs arranged like a merry-go-round or like umbrella spokes, are brazed horizontally and one above the other with an equal inter-distance from each other. The advantage of this type hose joint 1 resides in being extremely anti-vibrational because of its excellent rigidity, besides being similar in other points to the embodiment shown in FIG. 12.

Figure 15:
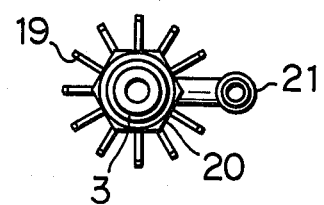
FIG. 15 is a plan view of another embodiment of a hose joint in accordance with this invention.
Figure 16:
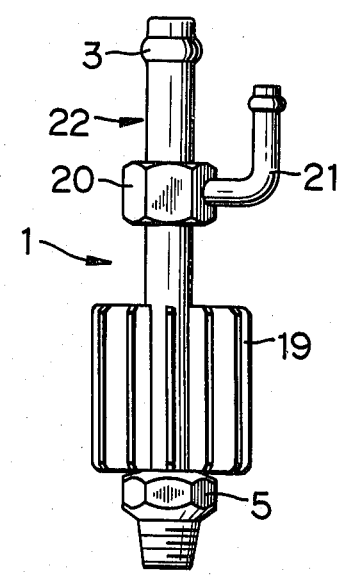
FIG. 16 is an elevational view of the hose joint shown in FIG. 15.

On the cooling portion of the hose joint 1 of another embodiment shown in FIGS. 15 and 16, twelve fins 19 of rectangular shape, being located respectively in a plane including the axis of the cooling portion, are erected in a radial direction by brazing. This type fins are little influenced in respect of cooling effect by the ventilation direction, which largely allows free choice of attaching direction of the hose joint 1. In this embodiment an annular body 20 is different from the annular body 4 in the previous embodiments; the annular body 20 is provided with another hose attaching portion 21 which is branched therefrom for being fitted by another hose on its end portion. At this hose attaching portion 21 the heat radiation from the cooling fins 19 is also effective to restrain the temperature rising there.

All of the embodiments are described only as examples. It is therefore goes without saying that this invention should not be interpreted as being limited to those embodiments by any means.

Although the cooling fins, the screw member, and the annular body are brazed to a tubular member for being fixed thereto in the described embodiments, they may be welded there instead, for example.

Although the number of the cooling fins is of course influential to the cooling effect, it may be variously changed according to the other heat conditions.

Although the surface area of the fins has much influence to the cooling effect, the circular fins may be, for example, changed to polygonal fins while maintaining the required surface area.

The hose attaching portion and the cooling portion must not necessarily be positioned in a linear relation, but they may be positioned to form a right angle or some other angles in-between.

What is claimed is:

1. A one-piece hose joint for connecting a flexible hose to a high-temperature object, comprising:
    a tubular member having first and second ends, and a cooling portion intermediate said ends, a protuberance at the first end, said first end being connected to said flexible hose with said protuberance positioned within said hose;
    a threaded member, and means securing said threaded member to said second end against movement relative thereto, said threaded member including a wrench-engageable head and further including a threaded end connected to said high-temperature object; and
    a plurality of fins fixedly engaging said cooling portion of said tubular member adjacent to said second end in axially spaced relationship with one another, the length of said cooling portion engaged by said fins being greater than that of said threaded member, and the radial width of said fins being greater than the width of said wrench-engageable head, said plurality of fins radiating heat conducted to said tubular member from said high-temperature object via said threaded member and intercepting radiant heat from said high-temperature object, whereby a temperature rise of said tubular member is restrained.

2. A hose joint as set forth in claim 1, wherein said plurality of fins are circular in shape, having identical outside diameters and are disposed perpendicular to the axis of said tubular member.

3. A hose joint as set forth in claim 1, wherein the plurality of fins are circular in shape, having outside diameters progressively increasing toward said second end of said tubular member and disposed perpendicular to the axis of said tubular member.

4. A hose joint as set forth in claim 1, wherein said plurality of fins are disposed in parallel to one another and slanted to the axis of said tubular member.

5. A hose joint as set forth in claim 1, wherein said plurality of fins each has a plurality of through-holes bored parallel to the axis of said tubular member.

6. A hose joint as set forth in claim 1, wherein said plurality of fins are circular in shape and radially corrugated to form concentric waves for an enlarged surface area thereof.

7. A hose jont as set forth in claim 1, wherein said plurality of fins are circular in shape and circumferentially corrugated to form radial fibs for an enlarged surface area and an increased rigidity thereof.

8. A hose joint as set forth in claim 1, wherein said plurality of fins are in the form of a spiral blade fixedly wound continuously around the outer periphery of said tubular member with a predetermined pitch, said spiral blade being perpendicular to the axis of said tubular member at every point of contact therewith.

9. A one-piece hose joint for connecting a flexible hose to a high-temperature object, comprising:
   a tubular member having first and second ends, and a cooling portion intermediate said ends, a protuberance at the first end, said first end being connected to said flexible hose with said protuberance positioned within said base;
   a threaded member, and means securing said threaded member to said second end against movement relative thereto, said threaded member including a wrench-engageable head secured to the second end of said tubular member, and further including a threaded end connected to said high-temperature object;
   a plurality of fins fixedly engaging said cooling portion of said tubular member adjacent to said second end in axially spaced relationship with one another; and
   a wrench-engageable hose stopper fixedly engaging a portion of said tubular member between said protuberance and said fins, the length of said cooling portion engaged by said fins being greater than that of said threaded member and the radial width of said fins being greater than the width of said wrench-engageable head, said plurality of fins radiating heat conducted to said tubular member from said high-temperature object via said threaded member and intercepting radiant heat from said high-temperature object, whereby a temperature rise of said tubular member is restrained.

10. A one-piece hose joint for connecting a rubber hose to an intake manifold of an internal combustion engine, comprising:
    a tube having first and second ends, and a cooling portion intermediate said ends, a protuberance at the first end, said first end being connected to said rubber hose with said protuberance positioned within said hose;
    a screw member, and means securing said threaded member to said second end against movement relative thereto, said threaded member including a wrench-engageable hexagonal head secured to the second end of said tube, and further including an externally threaded end connected to said intake manifold;
    a plurality of circular fins fixedly engaging said cooling portion of said tube adjacent to said second end in axially spaced relationship with one another, said circular fins each consisting of a radially outwardly extending ring section and an axially extending cylindrical flange section contiguous with the outer periphery of said cooling portion of said tube, said ring sections having identical outside diameters and being disposed in parallel to one another and perpendicular to the axis of said tube; and
    a wrench-engageable hexagonal hose stopper fixedly engaging a portion of said tube between said protuberance and said circular fins, the length of said cooling portion engaged by said fins being greater than that of said screw member and the radial width of said circular fins being greater than the width of said wrench-engageable hexagonal head, said plurality of circular fins radiating heat conducted to said tube from said intake manifold via said screw member and intercepting radiant heat from said intake manifold, said hose stopper engaging a wrench for screwing in said screw member, whereby a temperature rise of said tube is effectively restrained and the hose joint is readily connected to said intake manifold with either or both of said hexagonal head and said hexagonal hose stopper.

11. A one-piece hose joint for connecting a flexible hose to a high-temperature object, comprising:
    a hose attaching portion at a first end, connected to said flexible hose and including a protuberance located within said base when attached thereto;
    a threaded portion secured against movement at a second end, including a wrench-engageable head and a threaded end connected to said high-temperature object;
    a cooling portion located between said hose attaching portion and said threaded portion, and including a tubular body and a plurality of fins fixedly engaging the outer periphery of said tubular body in axially spaced relationship with one another; and
    a wrench-engageable hose stopper secured to an axially inward end of said hose attaching portion, the length of said cooling portion engaged by said fins being greater than that of said threaded portion and the radial width of said fins being greater than the width of said wrench-engageable head, said plurality of fins radiating heat conducted to said cooling portion from said high-temperature object via said threaded portion and intercepting radiant head from said high-temperature object, whereby a temperature rise of said hose attaching portion is restrained.

12. A one-piece hose joint for connecting a flexible hose to a high-temperature object, comprising:
    a tubular member having first and second ends, and a cooling portion intermediate said ends, a protuberance at the first end, said first end being connected to said flexible hose with said protuberance positioned within said hose;
    a threaded member, and means securing said threaded member to said second end against movement relative thereto, said threaded member including a wrench-engageable head secured to the second end of said tubular member, and further including a threaded end connected to said high-temperature object; and a plurality of rectangular planar fins fixedly engaging said cooling portion of said tubular member adjacent to said second end in circumferentially spaced relationship with one another and extending radially outward from the outer periphery of said tubular member, the length of said cooling portion engaged by said fins being greater than that of said wrench-engageable head, said planar fins radiating heat conducting to said tubular member from said high-temperature object via said threaded member while at the same time allowing a flow of air between said planar fins for natural convection, whereby a temperature rise of said tubular member is restrained.

* * * * *